UNITED STATES PATENT OFFICE.

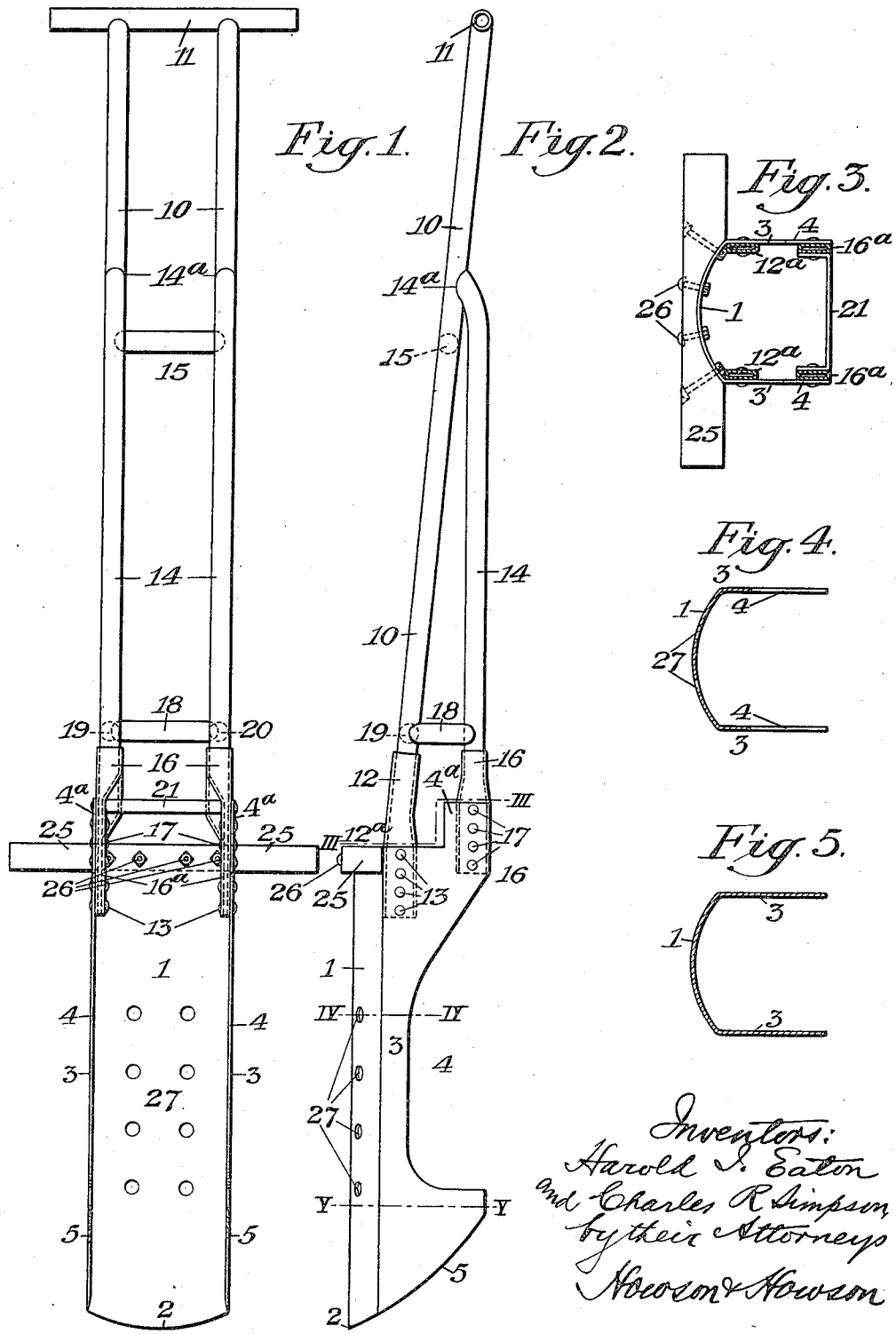

HAROLD I. EATON, OF ATLANTIC CITY, AND CHARLES R. SIMPSON, OF ELIZABETH, NEW JERSEY.

DITCHING SPADE OR SHOVEL.

1,305,079.

Specification of Letters Patent.   Patented May 27, 1919.

Application filed March 16, 1918.  Serial No. 222,895.

*To all whom it may concern:*

Be it known, that we, HAROLD I. EATON, a citizen of the United States, residing in Atlantic City, and CHARLES R. SIMPSON, a citizen of the United States, residing in Elizabeth, both in the State of New Jersey, have invented certain Improvements in Ditching Spades or Shovels, of which the following is a specification.

Our invention relates to digging implements, and consists of an improved form of ditching shovel available for operation by manual power, and comprising a so-called one-man shovel.

Our improved structure while available for many purposes is more particularly adapted for ditch or trench digging; the width of the blade or cutting portion of the shovel, which may be of any desired dimension within certain limits, being such as to be capable of producing a trench or ditch of the full width desired. The structure forming the subject of our invention is simple, strong, and serviceable, and admirably adapted to the work for which it is intended.

These and other features of our invention are more fully described hereinafter, reference being had to the accompanying drawings, in which:

Figure 1, is a front elevation of our improved ditching shovel.

Fig. 2, is a side elevation of the same, and

Figs. 3, 4 and 5, are sectional plan views on the lines III—III, IV—IV and V—V, Fig. 2.

The digging portion of our improved structure comprises a blade 1, preferably curved or arched as shown, which blade may be of sheet metal of suitable gage, having a lower rounded cutting edge 2; said blade being provided with side walls 3, of special construction, which side walls are cut away as indicated at 4. The lower edges of the side walls are substantially beveled as indicated at 5; the bevel being curved in the present instance and the edges being sharpened to form cutters, and these cutting edges are disposed at an angle with respect to the body of the blade so as to make a gradual drawing cut through the grass and roots encountered in the upper part of the soil through which the shovel is passed when in use. As noted, the side walls of the shovel are cut away at 4, an arrangement which materially reduces friction when the shovel is withdrawn from the gound, and eliminates suction at the sides. In addition, this construction facilitates removal of the sod from the shovel.

The handle portion of the shovel comprises side bars 10, which may have their upper ends connected by a cross bar 11, while their lower ends may be mounted in sockets 12 having flattened ends 12$^a$, which are secured to the upper part of the shovel blade by rivets or other fastening means 13. In addition, the side bars of the handle may be braced by struts 14, which engage said bars at the points 14$^a$ near the upper ends of the same and adjacent a cross bar 15, while the lower ends of said struts are mounted in sockets 16 having flattened ends 16$^a$ which are secured to the upper part of the shovel blade by rivets 17. The lower ends of the side bars and struts may be connected by suitable braces or cross-pieces 18, 19 and 20, while the upper part of the blade may have a cross-piece 21 disposed between the flattened portions of the sockets 16 receiving the struts; such cross-piece serving to stiffen the blade and prevent collapse of the upper portion of the side walls thereof which are extended at 4$^a$ for the attachment of said sockets 16.

For the purpose of providing means whereby pressure may be applied to the shovel blade to force it into the ground, we preferably secure to the upper portion of the blade a cross-bar 25, which may be of wood or a section of angle metal, (shown as of wood) and which preferably projects beyond both side walls of the blade. This cross-bar is preferably secured to the blade by bolts 26.

To avoid suction and to relieve to as great an extent as possible the friction on the rear face of the shovel blade when removing the material excavated, the blade may be apertured at 27. A plurality of apertures may be formed in the shovel blade, but not sufficient to impair the strength of the same.

We claim:

1. In a ditching spade or shovel, the combination with a handle structure, of a blade having side walls integral therewith; each of said side walls being cut away midway the length of the same to provide a plurality of cutting edges disposed diagonally with respect to the rear portion of the shovel; said handle structure having portions connected to the front and rear of said side walls at the upper portions of the same.

2. In a ditching spade or shovel, the combination with a handle structure of a blade having a curved back and side walls integral therewith; each of said side walls having a plurality of cutting edges disposed diagonally with respect thereto; said side walls being cut away midway top and bottom to form said cutting edges and for the purpose of reducing friction upon the sides when entering the shovel in the ground and removing the same therefrom and permitting ready removal of sod therefrom.

3. In a ditching spade or shovel, the combination with a handle structure of a curved blade having side walls integral therewith, said side walls being cut away at their central portion and having beveled cutting edges at the lower part of the same and said blade being apertured in its main wall to avoid suction.

4. The combination, in a ditching spade or shovel, of a blade having side walls integral therewith and disposed substantially at right angles to the main face of the blade, each of said side walls having a cutting edge inclined with respect thereto, a handle of tubular bars connected to said side walls; tubular struts connected to said handle bars and to the forward portions of the side walls, and a cross-bar spacing the lower ends of the struts.

5. The combination, in a ditching spade or shovel, of a curved blade having side walls integral therewith and disposed substantially at right angles to the main face of the blade, a handle of tubular bars connected to said side walls, tubular struts connected to said handle and to the side walls, and cross-bars spacing the tubular bars of the handle.

6. The combination, in a ditching spade or shovel, of a blade having a main wall and side walls integral therewith, a handle of tubular bars, sockets in which said tubular bars are mounted connected to said side walls, bracing means between said struts and the side walls of the shovel, and a foot-piece carried by the upper end of the blade and extending beyond the side walls of the same.

7. The combination, in a ditching spade or shovel, of a blade having side walls integral therewith and disposed substantially at right angles to the main face of the blade, a handle of tubular bars connected to said side walls, tubular struts connected to said handle, sockets connecting the struts with the side walls, and a cross-bar spacing the strut sockets and secured to the same adjacent the blade.

8. The combination, in a ditching spade or shovel, of a curved blade having side walls integral therewith and disposed substantially at right angles to the main face of the blade; said blade and side walls having lower cutting edges; a handle of tubular bars connected to said side walls, tubular struts connected to said handle and to the side walls, a cross-bar spacing the struts and secured to the same adjacent the blade, and a foot-piece carried by the upper end of the blade and extending beyond the side walls of the same.

HAROLD I. EATON.
CHARLES R. SIMPSON.